(12) United States Patent
Gray et al.

(10) Patent No.: US 8,965,681 B2
(45) Date of Patent: Feb. 24, 2015

(54) FIELD DEVICE COMMUNICATIONS

(75) Inventors: Michael D. Gray, Kennebunk, ME (US); Arthur Peter, III, York, ME (US); Mark A. Jadkowski, Hampden, ME (US)

(73) Assignee: Global Relief Technologies, Inc., Portsmouth, NH (US)

( * ) Notice: Subject to any disclaimer, the term of this patent is extended or adjusted under 35 U.S.C. 154(b) by 485 days.

(21) Appl. No.: 12/552,742

(22) Filed: Sep. 2, 2009

(65) Prior Publication Data

US 2010/0095065 A1 Apr. 15, 2010

Related U.S. Application Data

(60) Provisional application No. 61/136,411, filed on Sep. 3, 2008.

(51) Int. Cl.
  *G01C 21/26* (2006.01)
  *G06F 17/30* (2006.01)
  *H04W 4/02* (2009.01)
  *H04L 29/08* (2006.01)
  *G01C 21/20* (2006.01)

(52) U.S. Cl.
  CPC ...... *G06F 17/30241* (2013.01); *G06F 17/3048* (2013.01); *H04W 4/02* (2013.01); *H04L 67/2842* (2013.01); *H04L 67/18* (2013.01)
  USPC .......................................... 701/408; 701/400

(58) Field of Classification Search
  None
  See application file for complete search history.

(56) References Cited

U.S. PATENT DOCUMENTS

| | | | | |
|---|---|---|---|---|
| 5,628,050 A * | 5/1997 | McGraw et al. | ............ | 455/12.1 |
| 5,652,717 A * | 7/1997 | Miller et al. | ....................... | 703/6 |
| 5,774,449 A * | 6/1998 | Czachowski et al. | ......... | 702/182 |
| 5,815,417 A * | 9/1998 | Orr et al. | ........................... | 703/5 |
| 5,918,155 A * | 6/1999 | Nakamura et al. | ........... | 455/12.1 |
| 6,574,561 B2 * | 6/2003 | Alexander et al. | ................ | 702/5 |
| 6,868,340 B2 * | 3/2005 | Alexander et al. | ................ | 702/5 |
| 7,038,681 B2 * | 5/2006 | Scott et al. | .................... | 345/440 |
| 7,167,187 B2 * | 1/2007 | Scott et al. | .................... | 345/629 |
| 7,190,377 B2 * | 3/2007 | Scott et al. | .................... | 345/629 |
| 7,817,982 B1 * | 10/2010 | Chu et al. | .................... | 455/404.1 |
| 7,894,843 B2 * | 2/2011 | Smart et al. | .................... | 455/521 |
| 2002/0143469 A1 * | 10/2002 | Alexander et al. | ............... | 702/2 |
| 2003/0212494 A1 * | 11/2003 | Alexander et al. | ............... | 702/5 |
| 2005/0171952 A1 * | 8/2005 | Gray | .............................. | 707/10 |
| 2007/0096945 A1 * | 5/2007 | Rasmussen et al. | ....... | 340/995.1 |

* cited by examiner

*Primary Examiner* — Ian Jen
(74) *Attorney, Agent, or Firm* — Steptoe & Johnson LLP

(57) ABSTRACT

The present invention is a system and method for caching data in mobile devices to improve field assessment capabilities in a relief management system. The system analyzes captured geolocation information associated with one or more mobile field devices to identify a set of data to be cached by a mobile field device. The system then communicates the set of data to be cached to the mobile field device. The data cached is predicated upon the predicted likely location of field assessment operations and the data includes server-side image tiles.

5 Claims, 8 Drawing Sheets

FIELD DEVICE COMMUNICATIONS

TECHNICAL FIELD

This disclosure relates to transactional management and optimization between a server and mobile clients.

BACKGROUND

Field assessment operations employ very large server-side map-image databases (collected by satellite, aerostat, UAV and/or airplane) with increasing frequency. The images are used for visual assessment of ground conditions, navigation and situational awareness. However, the size of such map-image databases make them impractical for use on mobile computing devices due to (1) CPU and data storage constraints, and (2) data transfer constraints.

Mobile computing devices have a relatively (compared to personal computers, workstations and servers) slow CPUs and small data storage capability. For example as of the writing of this description, the data storage capability of a consumer level personal computer is measured in hundreds of gigabytes whereas that of a mobile computing device is measured in tens of gigabytes, roughly a 10:1 ratio. Mobile computing devices also follow a roughly 10:1 ratio.

Map-image databases (collected by satellite, aerostat, UAV and/or airplane) are very large relative to the CPU and data storage capabilities of mobile computing devices. For example a 1 meter resolution 24 bit color database covering an area of 300 km×300 km will be approximately 2160 gigabytes, well beyond the capability of any commercially produced mobile computing device. A 20:1 image compression of operationally acceptable quality would yield 108 gigabytes, still beyond the capability of any commercially produced mobile computing device. Even if such databases could be stored on a mobile computing device, the relatively slow CPU capabilities would create poor query and display performance.

While the CPUs and data storage capabilities of mobile computing devices improve from year to year, so do the capabilities of the sensors that produce image databases, with resulting image database size increases keeping pace or exceeding hardware improvements. For example, 1 foot pixel resolution databases are not uncommon for urban areas where just a few years ago 1 meter was the standard. The difference between 1 meter and 1 foot pixels yields a 10× increase in image database size for the same ground area. Indeed, certain urban areas are now available in 0.5 foot pixel resolution (a 40× increase over 1 meter).

This is further compounded by the availability and applicability of multiple image database collected by different sensors, for example true color and color infrared, and image database collected on different dates, for example before and after a natural or man-made disaster. It's not unusual to see 2× to 4× growth in image data storage requirements due to multiple sensors or dates.

The size of map-image databases used in filed assessments is further compounded by the widespread availability of pre-existing map-image database from commercial, non-profit and governmental entities. The size of such databases is routinely measured in terabytes and expected to grow by many petabytes in the future. While not all of this preexisting map-image data is applicable to any one field assessment project or activity, the amount of applicable data does grow proportionally to the growth of total map-image data available from governmental and commercial entities.

In addition to the limit created by the CPU and data storage capabilities of mobile devices, the practicality of using very large server-side image databases is further limited by the ability to transmit such image data over to mobile devices, over mobile networks, for example, cellular, satellite, or radio. The later limitations may be due to technical restrictions (available communications bandwidth), commercial restrictions (permitted use of bandwidth) or economic restrictions (cost of transmission).

Google™ Maps Mobile currently uses knowledge of current GPS position to determine which server-side image tiles at the user's current image display settings (image type, zoom detail level, geographic extent) should be transmitted to and stored on the mobile computing device. Google™ Maps Mobile employs client-side caching to a limited extent based on the user's current GPS position and image display selections. In other words, the only image tiles that are cached and available for disconnected use are for where the user has already been and for their past display selections, not necessarily where they will be at future times or for their future display selections.

To summarize, the field assessment requirements for using server side image databases (collected by satellite, aero stat, UAV and/or airplane) in mobile computing devices exceed (1) the CPU and data storage capabilities of such mobile computing devices, and (2) the data transfer capabilities of commercial mobile networks. These gaps are expected to persist into the future.

SUMMARY

The problem of providing client-side access to large image databases is solved through a process which queries the very large server-side databases to extract, transmit to, and store on the mobile computing device only those portions of the server-side image database which are of practical use to field assessment personnel. This is performed using one or more synchronization modules, such as, for example, an RDMS map-image synchronization module and a VNOC map-image synchronization web service, each of which is described in detail below.

In some implementations, the synchronization module(s) use one or more of the following approaches: (1) analysis of past latitude/longitude locations and prior image display selections, (2) prediction of location of future field assessment operations, and (3) prediction of future image display selections to select server-side image tiles. The primary advantage of these approaches is that they allow server-side image tiles to be transmitted and saved (or "cached") for use in future disconnected situations where mobile networks are inoperable or unavailable.

This process above may be augmented with a network optimization module for switching the communications for transmitting field assessments from mobile devices to the VNOC, and for downloading information from the VNOC to mobile devices, over cellular, satellite, WIFI or radio, based on, for example, one or more of the following: (1) user preferences, (2) network availability, (3) network bandwidth, (4) network reliability, (5) network commercial usage limitations, (6) network usage costs, and (7) the performance demands associated with specific data sets and field operations.

In combination, the two processes above optimize (1) the type and amount of map-image data being transmitted, and (2) the use of available communications networks may be used to transmit the map-image data. Therefore, in combination the two processes above make it practical to employ large server-side map-image databases in mobile computing devices for field assessment operations.

The details of one or more implementations are set forth in the accompanying drawings and the description below. Other features and advantages will be apparent from the description and drawings, and from the claims.

DETAILED DESCRIPTION

Figure 1:
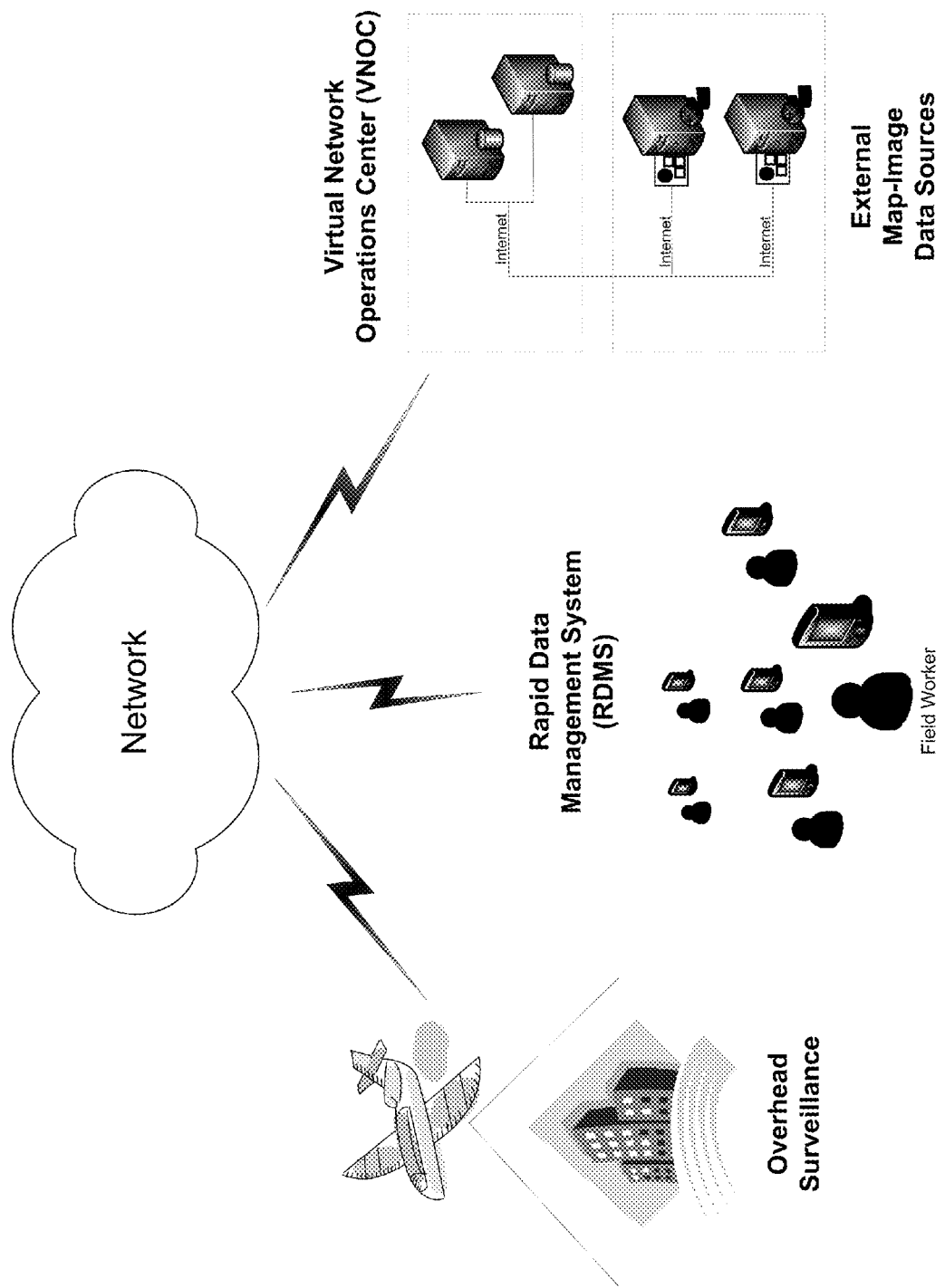
FIG. 1. Data collection from satellite, aerostat, UAV and/or airplane stored on a VNOC map and image data server.

This application describes various systems for persons to capture field assessments during relief operations. Using such a system, a relief agency can more effectively deploy workers and manage relief operations. For purposes of this description, the term "relief agency" encompasses all of the phrase's ordinary and customary meanings including, but not limited to, government, non-government, and international organizations and other entities that assess damage wrought by natural forces, such as hurricanes, typhoons, earthquakes, and the damages wrought by man-made forces such as war and insurrection.

In a preferred implementation, an end-to-end service is provided through which field personnel can inspect and collect information from disaster areas. The collected information is organized as a selectable privilege-based user-accessible database, and the information is distributed among, through default and user-selectable formats, and between disaster relief agencies, and other users through privilege-based access.

Some implementations include a central information distribution and management center, one or more agency headquarter centers, and a plurality of field units, which are portable communication devices carried by or mounted to the vehicles of field personnel.

A typical system further includes a wide-area communication network such as, for example, the Internet, and other described networks for communication among and between the field units, the central information management center, and the one or more relief agency headquarter centers.

In the described embodiments, the field units operate within, and have circuitry for utilizing, a geo-positioning system such as, for example, the Global Positioning System (GPS). Utilization of geo-positioning system is preferred because, as will be described, the field unit's geolocation is included in the evaluation reports that the units deliver via uplink to the central information management center.

The field units display graphical user interface (OUI) forms to the user for entry of damage assessment information and for uploading the information as a damage assessment report. The forms are typically stored in the field units, and are typically customized for the particular relief agency associated with the field person possessing the field unit. Updating of the forms by downlink from the central information management center is contemplated. The damage assessment reports include the geolocation of the sending field unit and a data, or other information, identifying the relief agency associated with the sender. The central information management center has distribution privilege data that typically maintains, for each relief agency, a list of other agencies, if any, to which the sending agency's damage assessment report information may be distributed. The distribution privilege data may specify the distribution more particularly, such as certain types of information being distributed to certain other agencies.

The field units also display real-time maps to the user, a typical map utilizing geographical map data stored in the field unit on which updated situation information, received by downlink from the central information management center, is overlaid and displayed.

The following description includes numerous example details and specifics, some of which pertain only to the specific examples presented, and which are included only to assist in describing these specific examples, and thus assist the reader in understanding the features and elements of the described system. It will be evident to ones skilled in the art that the described systems and methods can be practiced without, and with different ones of, these details and specifics.

This description assumes the reader to have ordinary skill in the relevant arts of wide area networks (WAN) such as, for example, the Internet, virtual private networks (VPN) employing public channels, local area networks (LAN), commercially available database software and hardware systems, and the interface protocols for users to access same, available satellite telephone systems, cellular telephone systems, and personal computers and hand-held computing devices. Details for implementing the described systems and methods, to the extent such details are knowledge possessed by persons of skill in the above-listed arts, by which such persons after reading this description can select from among, configure and assemble commercial components into the described systems, are omitted.

Relief communications requires some degree of flexibility. In typical relief operations, broadband data networking capabilities may be unavailable, or only available in limited locations. Further, data communications in relief operations typically provide limited capacity and/or availability. However, there is a need to access server-based data stores, such as map image data that cannot reside on mobile field devices, for example, because of their dynamic nature, or because of their large size. It is desirable to cache various information for use on mobile computing devices used to capture field assessments In some implementations, the problem is solved through a process which queries the very large server-side databases to extract, transmit to, and store on the mobile computing device only those portions of the server-side image database with are of practical use to field assessment personnel. This is done with an ROMS map-image synchronization module and a VNOC map-image synchronization web service, each of which is described in detail below.

This design allows server-side image tiles to be transmitted and cached for use in future disconnected situations with minimal interaction by the user. This is useful for field assessment operations where the user moves in and out of connected environments and disconnected environments where mobile networks are inoperable or unavailable, and where the user does not have the time and/or skills to determine which image tiles will be needed ahead of time.

This process above may be augmented with a network optimization module for switching the communications for transmitting field assessments from mobile devices to the VNOC, and for downloading information from the VNOC to mobile devices, over cellular, satellite, WIFI or radio, based on any combination of (1) user preferences, (2) network availability, (3) network bandwidth, (4) network reliability, (5) network commercial usage limitations, (6) network usage costs, and (7) the performance demands associated with specific data sets and field operations.

In combination, the two processes above optimize (1) the type and amount of map image data being transmitted, and (2) the use of available communications networks used to transmit the map-image data. Therefore, in combination the two processes above make it practical to employ large server-side map-image databases in mobile computing devices for field assessment operations.

With respect to FIG. 1, overhead surveillance operations (satellite, aerostat, UAV and/or airplane) collect large volumes of map-image data.

The overhead surveillance map-image data are transmitted to and stored on VNOC data servers from which they may be viewed and used by VNOC users (headquarters personnel, field users, partner organizations).

The overhead surveillance map-image data are used together with preexisting map-image data on the VNOC as well as external commercial and governmental map-image data sources.

The map-image data may be transmitted to field assessment workers using ROMS on mobile computing devices through a communication network.

The communications network can be any combination of satellite based, cellular based, LAN/WAN based, WiFi based and/or any other data communication methodology including transportation of hard data storage media. See FIG. 8 for more detail.

Figure 2:
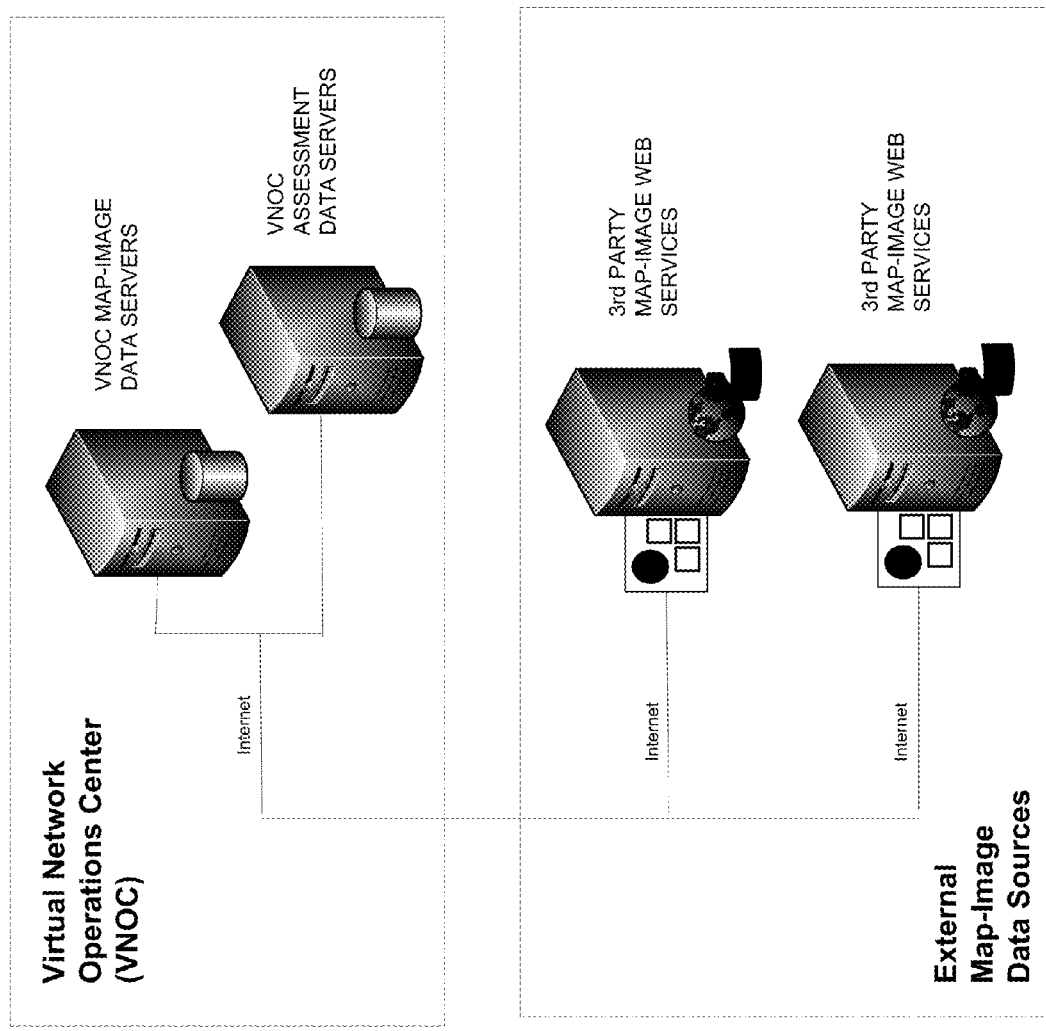
FIG. 2. Large map-image databases.

With respect to FIG. 2, the map-image databases stored on or accessible through the VNOC may reside on any combination of one or more data servers within the VNOC, and/or any combination of one or more external map-image data servers operated by commercial, non-profit, or governmental entities.

The external map-image data are accessed by the VNOC through web services over the Internet.

Note that certain external map-image data may also be accessed by RDMS through web services if the RDMS mobile computing device is connected to the Internet.

Figure 3:
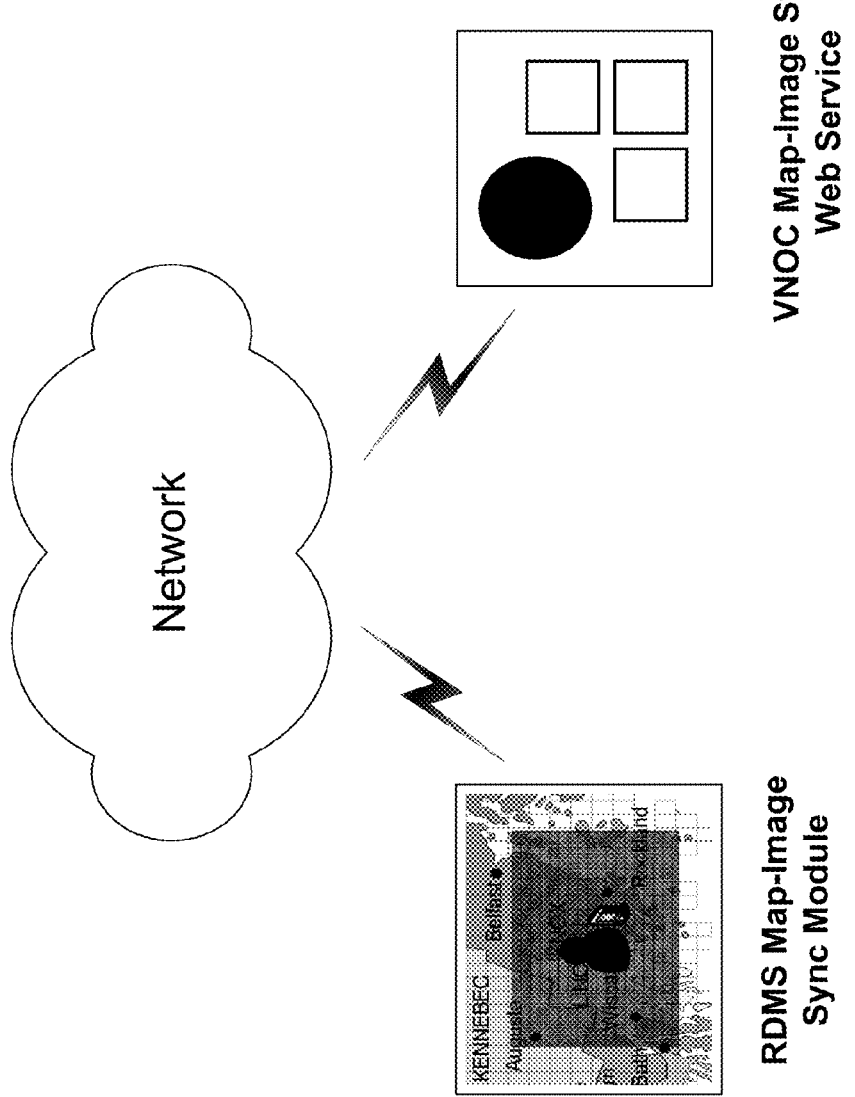
FIG. 3. Map-image synchronization and communication system components.

With respect to FIG. 3, the map-image synchronization and communication system components consist of three components: (1) RDMS map-image synchronization module, (2) VNOC map-image synchronization web service, and (3) a communication network.

The "RDMS map-image synchronization module" controls requests for map-image data originating from mobile computing devices running RDMS software. The RDMS map-image synchronization module also controls the delivery and storage ("caching") of the map image data on the mobile computing devices. See FIG. 4 for more detail.

The "VNOCS map-image synchronization web service" accepts and processes requests for map-image data sent by the RDMS map-image synchronization module. See FIG. 7 for more detail.

The communications network used for map-image data can be any combination of satellite based, cellular based, LAN/WAN based, WiFi based and/or any other data communication methodology including transportation of hard data storage media. See FIG. 8 for more detail.

Figure 4:
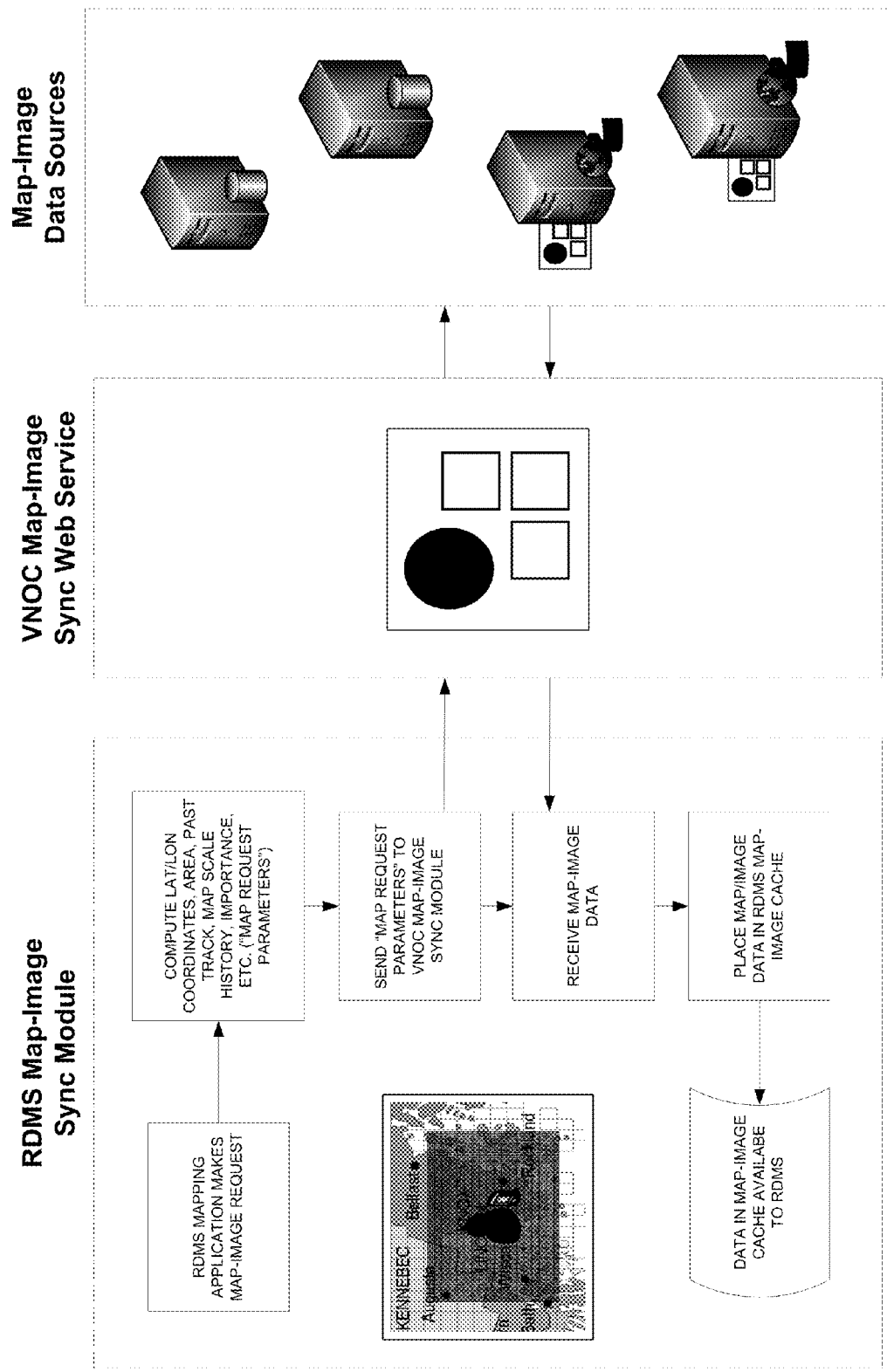
FIG. 4. RDMS map-image synchronization module transactions.

With respect to FIG. 4, Map-Image Synchronization Module is a software program that may be an integral part of or an external module to the RDMS software application.

The RDMS software application makes an internal request to the RDMS Map-Image Synchronization Module for map-image data.

Next the RDMS Map-Image Synchronization Module computes a set of "map request parameters" from internally computed and user-entered information. The Map request parameters may include any combination of the following: Geographic extent (see FIG. 5), Map-image type(s) (e.g., street map, color orthophotos, etc.), Resolution level or resolution range (e.g., scale, detail, DPI, etc.), Specified map data layer(s) (e.g., major roads, major rivers, etc.), Date or date range of map-images, Geocoding (address, POI or place name to lat/lon), Reverse geocoding (lat/lon to address, demographics, etc.), Driving directions (by start/end lat/lon or addresses or POI), Allowable price or price range, Allowable file size maximum or size range, and/or Contractual/license usage limitations, Relative importance of the factors listed here.

Next, the RDMS Map-Image Synchronization Module sends the map request parameters to the VNOC Map-Image Synchronization Web Service.

Next, the RDMS VNOC Map-Image Synchronization Web Service analyzes the map request parameters, queries all available sources to determine what data is available, computes an optimal map-image catalog, and obtains the optimal map-image data from the available data sources. See FIG. 7 for more detail.

Next, the RDMS Map-Image Synchronization Module receives map-image data from the VNOC Map-Image Synchronization Web Service.

Next, the RDMS Map-Image Synchronization Module places (or "caches") the map image data in a memory or data storage location on the mobile computing devices from where it will be available to the RDMS software application.

Administrative functions included in the operation of the Map-Image Synchronization Module may include any combination of the following: Automatic recovery of all synchronization processes (i.e., resume and complete interrupted requests and downloads), Query how many bytes of data will be returned by the VNOC for specified request, Query how many files will be returned by the VNOC for specified request, Query how long the request takes to process by the VNOC, Query how long the data will take to download given the network, Checksums to ensure no corrupted data during transmission through the network, Method to use receipt flags to document successful transmission through the network, Method to use TCP/IP to determine in all requested data were received, Method to automatically restart incomplete or interrupted transmissions at break point (i.e., not send successfully sent data again), Method to determine available connection methods and best one for the task, and/or Method to queue transmission until the desired connection is available.

Figure 5:
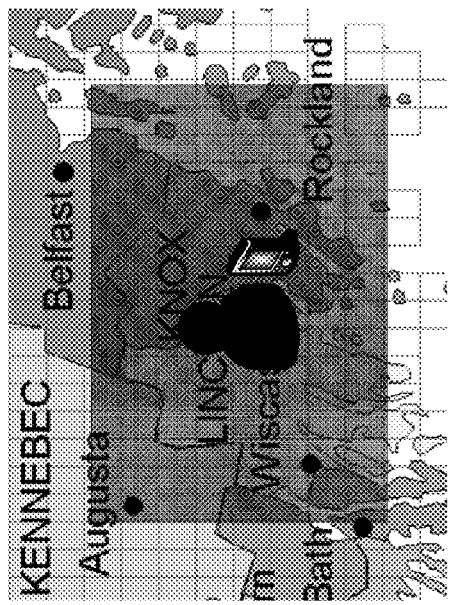
FIG. 5. Geographic extent descriptors
Figure 5:
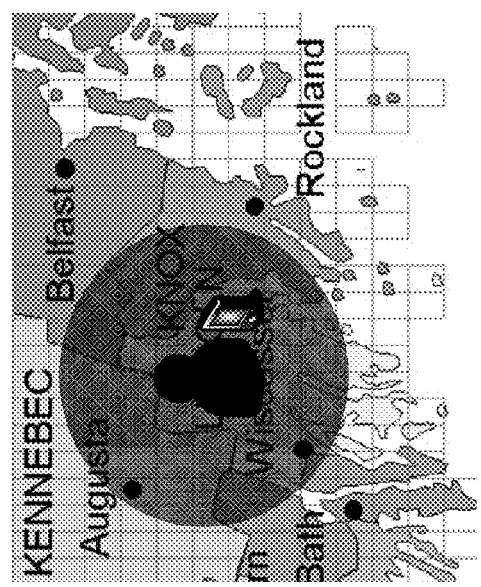

With respect to FIG. 5, the RDMS image-map synchronization module uses geographic extent descriptors (in addition to other map request parameters) to specify the extent of map-image coverage. Geographic descriptors include one or more locations defined by latitude/longitude coordinates and geographic extent.

The latitude/longitude location can be (1) the GPS location of the mobile computing device, (2) latitude/longitude coordinates entered or drawn by the user of the mobile computing device, or (3) any other method of measuring latitude/longitude.

The geographic extent can be described by (1) a circle as refined by a radial distance away from the latitude/longitude location, (2) a rectangle centered on the latitude/longitude location, or (3) a any line or shape defined by the latitude/longitude location and additional map coordinates.

Other geographic descriptors may include any combination of the following: Work zone or work order location, corridor, boundary or grid, Contained within or intersecting a specified zip code boundary, Contained within or intersecting a specified political boundary (city, state, county, country, etc.), Contained within or intersecting a land public land boundary (e.g., state park, etc.), Contained within or intersecting a land survey boundary (e.g., land parcel, etc.), and/or Geocoding (address, POI or place name to lat/lon).

Note that geographic extent may be based on predictions made from past RDMS activities (e.g., the pattern of past GPS locations). For example, if a RDMS mobile computing device with a GPS is exhibiting a steady pattern of moving North-East, then it would be reasonable to predict that future geographic extents would be continuations of the current geographic extent in a North-East direction.

Figure 6:
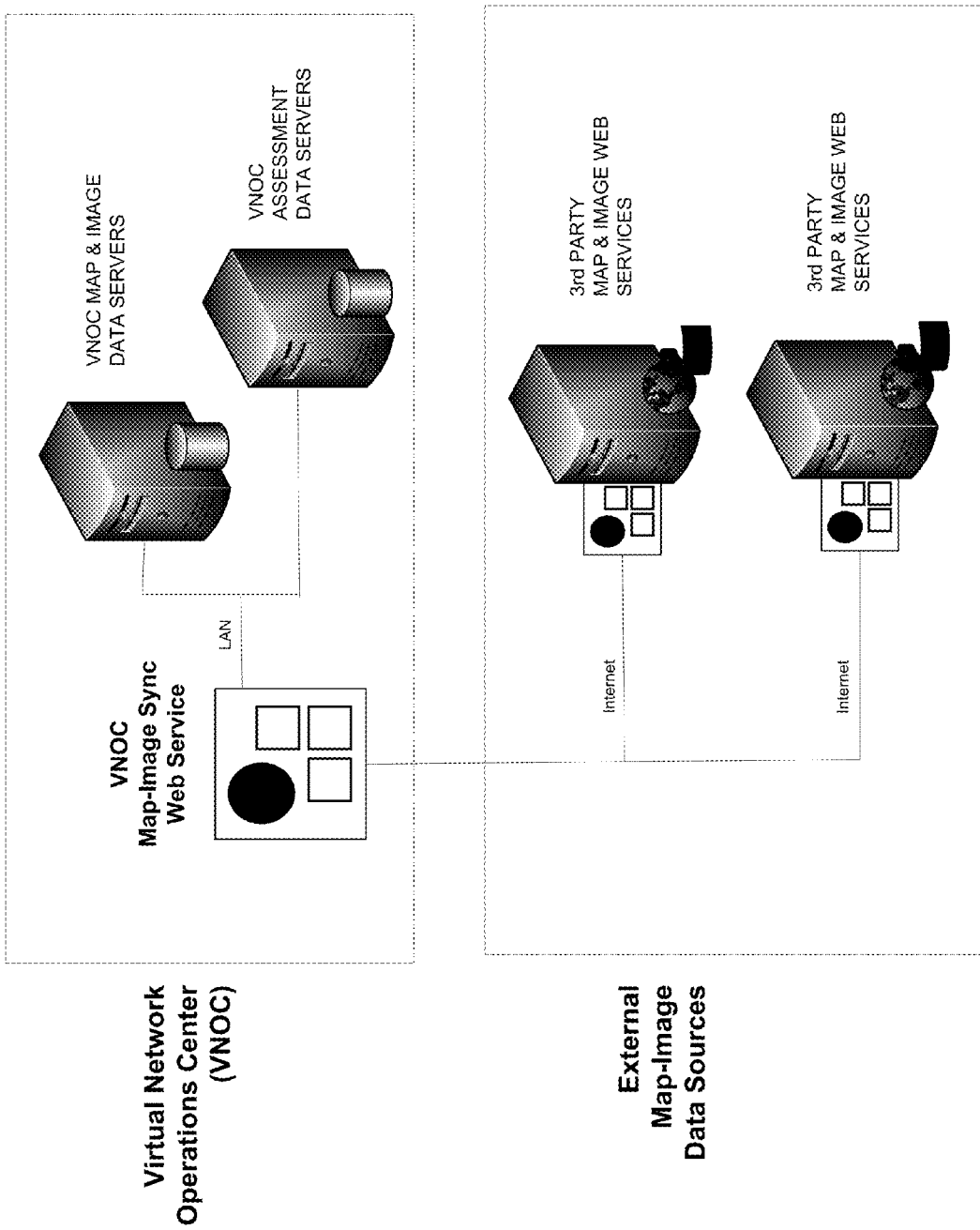
FIG. 6. VNOC map-image synchronization web service and the data servers and web services that it accesses.

With respect to FIG. 6, the VNOC map-image synchronization web service is a software program running on a server that is connected to the internet and/or some other network. It is connected via the internet and/or some other network and/or some other connection to VNOC servers that are used to store and manage field assessment data and map-image data.

The VNOC map-image synchronization web service may also be connected to external map-image data sources provided or operated by commercial, non-profit and/or governmental entities.

The connection between the VNOC map-image synchronization web service and any external map-image data source may be any combination of the internet, some other network, some other connection, and/or shipping data on hard media.

Figure 7:
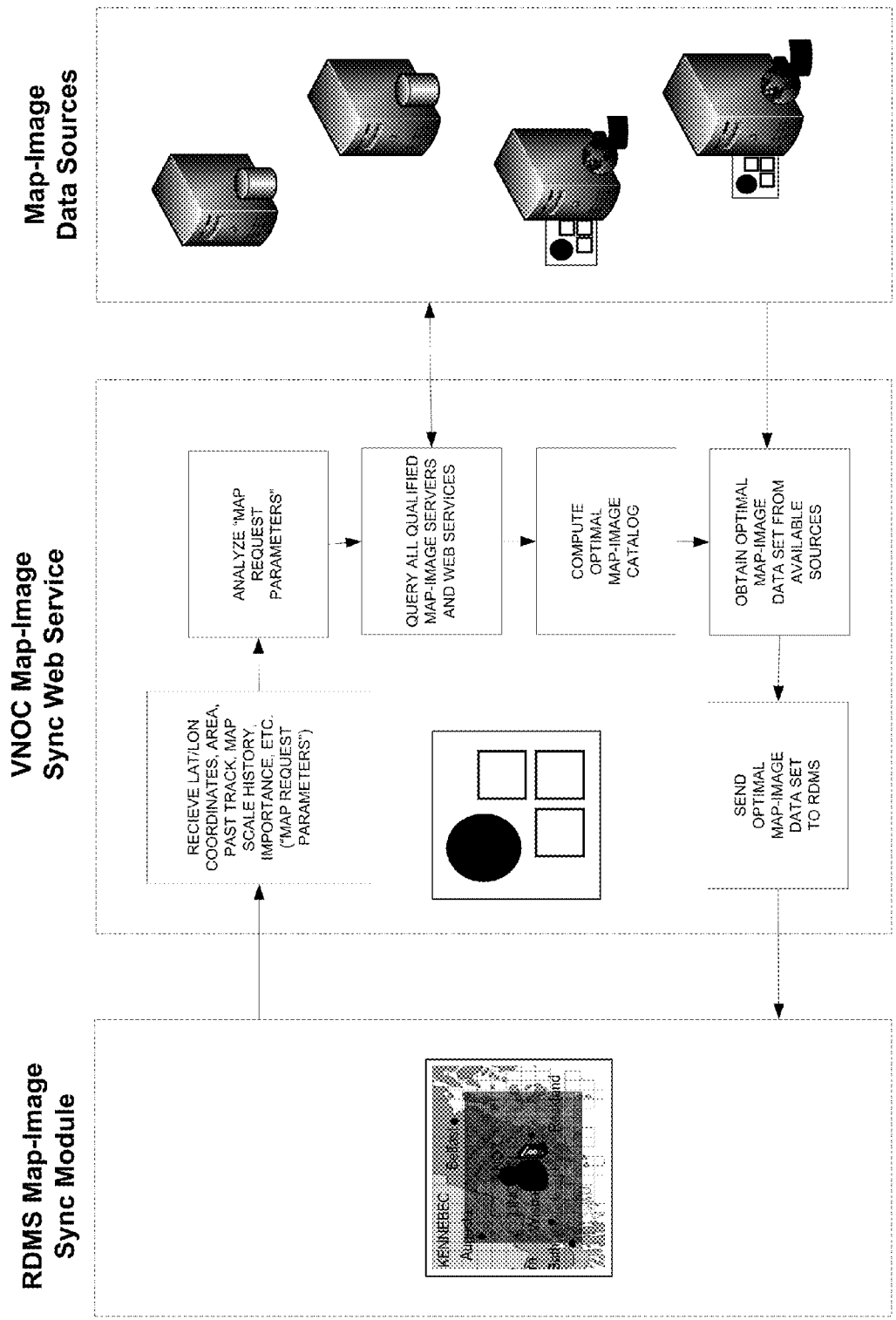
FIG. 7. VNOC map-image synchronization web service transactions.

With respect to FIG. 7, the VNOC map-image synchronization web service is a software program running on a server that is connected to the internet and/or some other network.

The VNOC map-image synchronization web service receives map request parameters sent by a RDMS image-map synchronization module (see FIG. 4).

Next, the VNOC map-image synchronization web service analyzes the map request parameters to qualify which potential map-image data sources it should queried to determine data availability (the "qualified map-image sources"). The analysis to determine which map image data sources are qualified may be done through any combination of mathematical, statistical, empirical and/or user-selection methodologies, and may consider any combination of the following factors: Availability of map-image data for the requested geographic extent or portion thereof, Availability of map-image data for the requested map-image type(s) (e.g., street map, color orthophotos, etc.) or portion thereof, Availability of map-image data for the requested resolution level or resolution range (e.g., scale, detail, DPI, etc.) or portion thereof, Availability of map-image data for the specified map data layler(s) (e.g., major roads, major rivers, etc.) or portion thereof, Availability of map-image data for the requested date or date range of map-images or portion thereof, Availability of geocoding services (address, POI or place name to lat/lon) or portion thereof, Availability of reverse geocoding services (lat/lon to address, demographics, etc.) or portion thereof, Availability of driving directions services (by start/end lat/lon or addresses or POI), Availability of map-image data for the requested allowable price or price range, Availability of map-image data for the requested contractual/license usage limitations, and/or Relative importance of the factors listed here.

Next, the VNOC map-image synchronization web service queries the qualified map image data sources to determine what map-image data is available that meets the specific map request parameters (the "qualified map-image data"). These queries may use any combination of the factors above, but instead of just reporting if a data source is "qualified" it will report which specific map-image data sets available from the qualified data source are qualified. Note that this step may be combined with the previous step into one step for some map-image data sources.

Next, the VNOC map-image synchronization web service analyzes the qualified map image data to determine an optimal collection qualified map-image data from one or more qualified map-image sources (the "optimal map-image catalog"). The catalog may be described using any means including but not limited to XML. The analysis to determine the optimal map-image catalog may be done through any combination of mathematical, statistical, empirical and/or user-selection methodologies, and may consider any combination of the following factors: Combinations of qualified map-image data sets or subsets that result in an optimal coverage of the requested geographic extent, Combinations of qualified map-image data sets or subsets that result in an optimal types, layers and resolutions, Combinations of qualified map-image data sets or subsets that result in an optimal total file size, Combinations of qualified map-image data sets or subsets that result in an optimal licensing/purchase costs and contract terms, Combinations of qualified map-image data sets or subsets that result in an optimal data transmission time and cost, and/or Relative importance of the factors listed here.

Next, the VNOC map-image synchronization web service obtains the data specified in optimal map-image catalog. Obtaining the data map be done through any combination of Internet or network protocols or shipping hard media. The obtained data may be cached on the VNOC for back-up purposes or to expedite subsequent request by other ROMS mobile computing devices.

Next, the VNOC map-image synchronization web service transmits the obtained data to the requesting ROMS image-map synchronization module.

Administrative functions included in the operation of the map-image synchronization web service may include any combination of the following: Automatic recovery of all synchronization processes (i.e., resume and complete interrupted requests and downloads), Calculate and send how many bytes of data will be returned to RDMS for specified request, Calculate and send how many files will be returned to RDMS for specified request, Calculate and send how long the request take to process, Calculate and send how long the data will take to download given the network, Calculate and send checksums to ensure no corrupted data during transmission through the network, Method to use receipt flags to document successful transmission through the network, Method to use TCP/IP to determine in all requested data were received, Method to automatically restart incomplete or interrupted transmissions at break point (i.e., not send successfully sent data again), Method to determine available connection methods and best one for the task, and/or Method to queue transmission until the desired connection is available.

Figure 8:
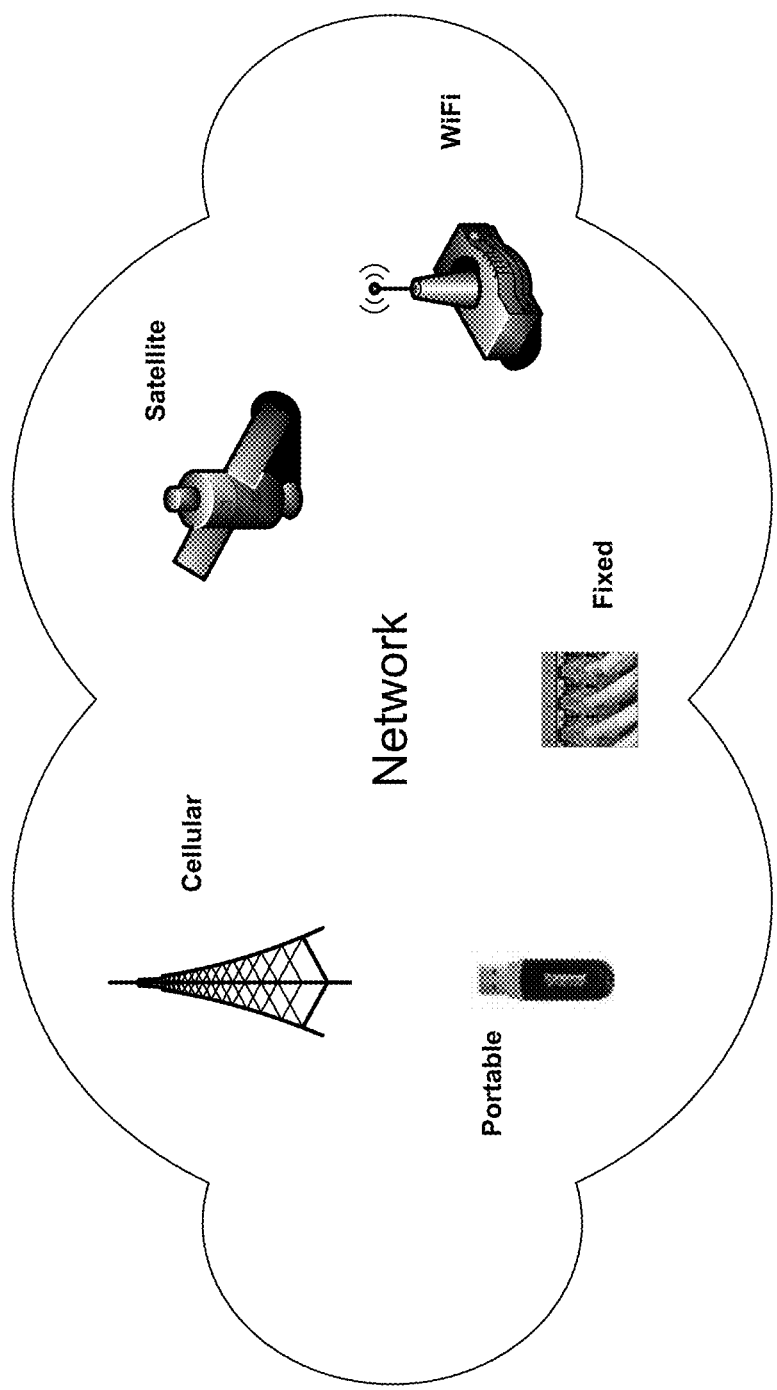
FIG. 8. Network optimization module.

With respect to FIG. 8, the network optimization module is a software program that may reside with either or on both the VNOC or RDMS.

The communications networks used to transmit map-image data may consist of any combination of (1) cellular data communications; (2) satellite data communications; (3) WiFi data communications; (4) fixed wire or fiber-optic cable; (5) portable data storage media, and/or (6) any other method of data communication.

The network optimization module pick the best network or combination of networks using knowledge of the data to be downloaded by given the map request parameters and map return parameters which are provided by the RDMS map-image synchronization module or the VNOC map-image synchronization web services respectively.

The analysis to determine the optimal network or combination of networks may be done through any combination of mathematical, statistical, empirical and/or user-selection methodologies, and may consider any combination of the following factors: Urgency of data transmission, Network availability, Network bandwidth, Network reliability, Network commercial usage limitations, Network usage costs, User preferences, and/or Relative importance of the factors listed here.

Administrative functions included in the operation of the map-image synchronization web service may include any combination of the following: Method to use receipt flags to document successful transmission through the network, Method to use TCP/IP to determine in all requested data were received, Method to automatically restart incomplete or interrupted transmissions at break point (i.e., not send successfully sent data again), Method to determine available connection methods and best one for the task, and/or Method to queue transmission until the desired connection is available.

In one implementation, mobile field devices are periodically updated to maintain a state of deployment readiness. Devices are stored in such a manner as to ensure batteries are fully charged and conditioned for immediate deployment. Further, the mobile devices are stored in a network-enabled state to allow software upgrades and data caching using the one or more of the techniques described above. For example, a process can review weather reports issued by the National Weather Service related to tropical storms and hurricanes. The mobile devices can be readied for deployment at the most likely points of landfall. As landfall predictions change, the cached information stored on the devices may be updated so that they are constantly ready for deployment.

What is claimed is:

1. A method for caching data in mobile devices to improve field assessment capabilities in a relief management system, the method comprising:
   analyzing captured geolocation information and prior image display selections associated with one or more mobile field devices to identify a set of map-image data to be cached by a mobile field device for display in a future situation; and
   communicating the set of map-image data to be cached to the mobile field device by a wireless signal.

2. A method for caching data in mobile devices to improve field assessment capabilities in a relief management system, the method comprising:
   analyzing data of a previous communication and prior image display selections to predict a likely location of field assessment operations and future image display selections;
   identifying a set of map-image data to be cached by a mobile field device for display in a future situation based on the predicted likely location of field assessment operations and image display selections; and
   communicating the set of map-image data to be cached to the mobile field device by a wireless signal.

3. The method of claim 2, wherein the set of data includes server-side image tiles.

4. The method of claim 1, further comprising predicting a future location based on the set of data to be cached.

5. The method of claim 2, further comprising processing the server-side image tiles on the mobile device to predict a future geographic extent.

* * * * *